Sept. 23, 1958  J. PLÖEN  2,853,636
CURRENT EQUALIZATION DEVICE FOR CONDUCTORS TO THE ELECTRODES
IN ALTERNATING CURRENT ELECTRO-FURNACES
Filed Feb. 28, 1955  3 Sheets-Sheet 1

INVENTOR
JAN PLÖEN

BY Wenderoth, Lind + Ponack

ATTORNEYS

INVENTOR
JAN PLÖEN
BY Wenderoth, Lind + Ponack
ATTORNEYS

Sept. 23, 1958 J. PLÖEN 2,853,636
CURRENT EQUALIZATION DEVICE FOR CONDUCTORS TO THE ELECTRODES
IN ALTERNATING CURRENT ELECTRO-FURNACES
Filed Feb. 28, 1955 3 Sheets-Sheet 3
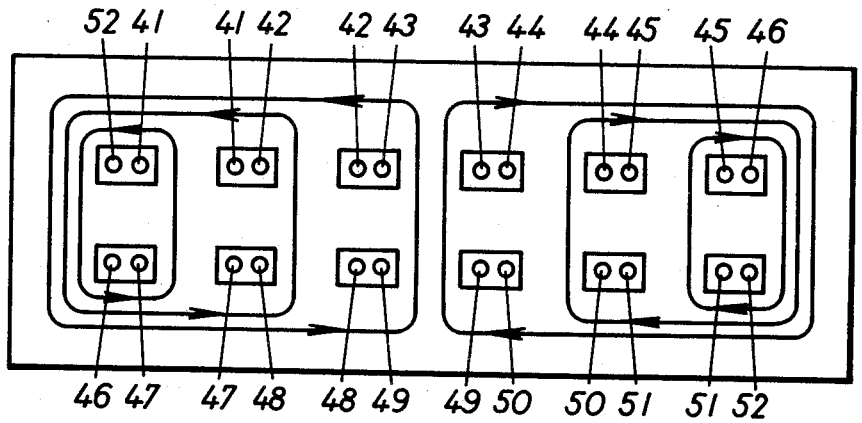
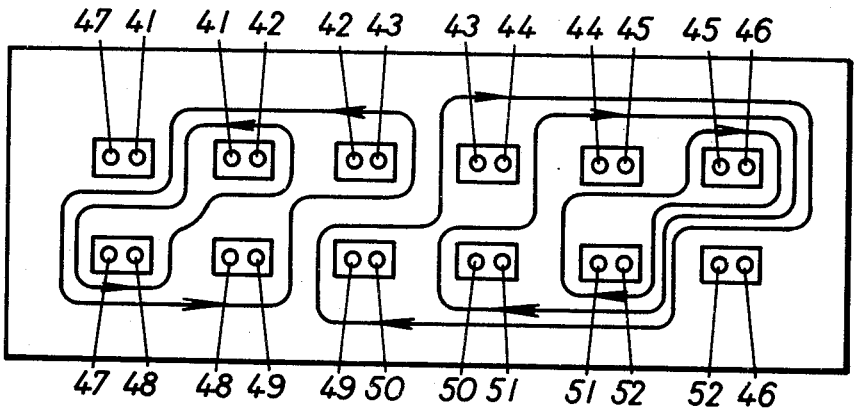
FIG.7.
41 42 43 44 45 46
O  O  O  O  O  O
O  O  O  O  O  O
47 48 49 50 51 52
INVENTOR
JAN PLÖEN
BY Wanderoth, Lind + Ponack
ATTORNEYS United States Patent Office 2,853,636
Patented Sept. 23, 1958

2,853,636

CURRENT EQUALIZATION DEVICE FOR CONDUCTORS TO THE ELECTRODES IN ALTERNATING CURRENT ELECTRO-FURNACES

Jan Plöen, Oslo, Norway, assignor to Christiania Spigerverk, Oslo, Norway

Application February 28, 1955, Serial No. 491,149

Claims priority, application Norway March 12, 1954

6 Claims. (Cl. 307—147)

In alternating current electro-furnaces the current is usually supplied from the transformer to the electrodes through several parallel conductors. As the electrodes necessarily have to be freely raised and lowered, the current supply is normally effected by means of a system of conductors which start with fixed bars from the transformer terminals followed by flexible cables giving the necessary freedom of movement. These are in turn connected to bars on the furnace, these bars being connected to the electrode clamping device. Water-cooled pipes are occasionally used instead of bars. The currents are normally high and thus require numerous parallel conductors, say 10 or more.

Powerful magnetic fields are created round the conductors due to the action of the current, reducing the current in some conductors and increasing it in others. An unequal current distribution in the conductors of one phase can also be caused by the fields from the other phases, the distance between the phases being relatively small compared with the distance between the parallel conductors of one phase. The stabilizing ohmic resistance in such a conductor system is small, for which reason the current in the various parallel conductors is very unequal. This uneven current distribution results in poor utilization of the conductors, resulting in a high temperature in some heavily loaded conductors and considerably greater loss in transmission than if the distribution was equal over all of the conductors.

The poor utilization of the total available wire cross section results in a requirement for a greater number of cables than in the case of even distribution over all cables, resulting in heavy maintenance costs and complex suspension arrangements for the cables.

In addition the concentration of the fields caused by uneven distribution of current increases the magnetic fields of certain conductors, extremely agitating the conductors. Such agitation may short-circuit the phases and increase the stresses in the cables, spacing units and insulating devices.

Moreover, an unequal distribution of current increases the reactance of the system.

An attempt has been made to solve these problems by revolved cables. This has resulted, however, in a greatly reduced flexibility and increase in the space occupied by the conductors.

The purpose of the device according to the present invention is to equalize the distribution of current in parallel conductors to electrodes in alternating current electro-furnaces. This purpose is attained by coupling the conductors magnetically in pairs, in such a way that all the conductors are magnetically linked together. This can be accomplished, for example, by passing the conductors in each pair in opposite directions through a laminated core. With the exception of the two conductors forming the first and last link of the magnetic chain, each conductor is magnetically coupled to two of the other conductors, the conductors being consecutively led through two laminated iron cores. A closed magnetic chain can also be effected by coupling magnetically the first and last link.

The various iron cores can with advantage be replaced by a single core with holes therethrough for the different conductors.

Two or more parallel conductors may, without any external interference, carry the same current. All conductors carrying equal current can be grouped and treated as one conductor. The invention also comprises an embodiment in which such groups of conductors are magnetically coupled in pairs as stated above.

It has hitherto been the practice to operate with average current densities of 1.3–1.4 amp./mm.$^2$ for cables on electric furnaces. With a perfectly even distribution of current, such as is obtained by the device according to the invention, it is possible without difficulty to operate with a current density of 2.2–2.5 amp./mm.$^2$. This allows a reduction of the cable cross section of at least 60%.

With a device for equal current distribution according to the invention, the cross-sectional area of the cables can with greater accuracy be chosen most economically as to original costs, losses and upkeep.

The invention will be explained in detail in the following text and with reference to accompanying drawings.

Fig. 5 shows a section through a core according to a further embodiment of the invention.

Fig. 6 shows a section of the core as shown in Fig. 5 with a different arrangement of the conductors.

Fig. 7 shows the positioning and numbering of cables in the devices depicted by Fig. 5 or Fig. 6.

Fig. 8 shows an equalizing transformer for three phase current according to the invention, while

Figure 1:
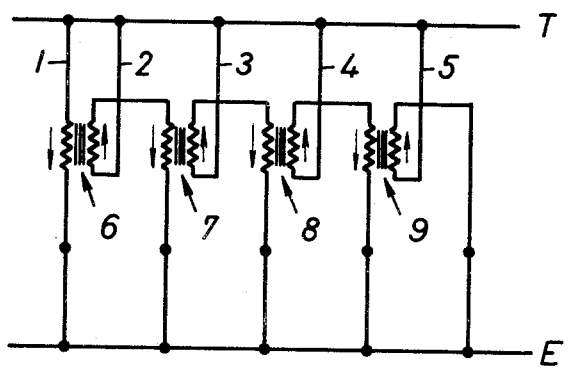
Fig. 1 shows a diagram of one application of the device according to the invention.

In Fig. 1 the numbers 1, 2, 3, 4 and 5 denote conductors supplying the current from a transformer terminal "T" to an electrode terminal "E."

6, 7, 8 and 9 denote laminated iron cores. As will be seen, conductors 1 and 2 pass through the iron core 6 in opposite directions. Conductor 1 is then connected directly to the electrode terminal E, while conductor 2 makes a second pass through core 7 parallel to, but in the opposite direction to conductor 3. Conductor 3 thence passes through core 8 parallel to, but in the opposite direction to conductor 4, which in turn passes through core 9 parallel to but in the opposite direction to conductor 5. Conductor 5 is then directly connected to electrode terminal E. Conductors 1, 2, 3, 4 and 5 are thereby magnetically coupled together into a chain. Core 6 forces the currents in conductors 1 and 2 to equalize. In the same manner core 7 equalizes the currents in conductors 2 and 3, and so on. Core 6 must be designed to absorb the induced voltage in the current loop formed by conductors 1 and 2. The same is true of all other cores. The current differential in two conductors will be equivalent to the magnetizing current required by the core through which they pass, this current being very small.

Figure 2:
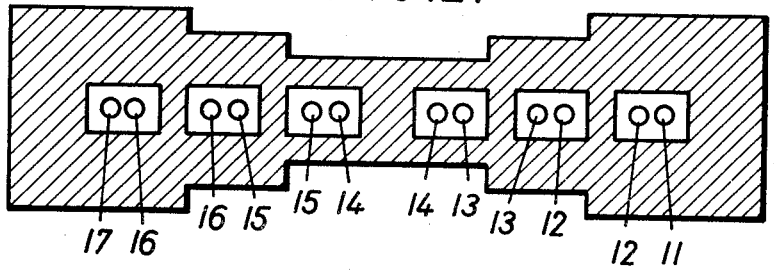
Fig. 2 shows schematically a section through an iron core, according to the invention.

Fig. 2 shows a section through an iron core, designed for seven conductors, 11—17. Joining the cores in one unit as shown in Fig. 2 makes a superpositioning of the magnetic fields possible, thus reducing the required core dimensions. It will be understood that parts of the conductors with the same numbers pass through the core in opposite directions.

As stated above, current is usually supplied to an electrode through a conducting device the first section of which is composed of bars or tubes extending from the transformer terminal to the cable suspension, then through a section of flexible cable, which in turn is connected to bars or tubes on the furnace while in turn are connected to the electrode. The number of parallel bars or tubes and parallel cables need not be, and in general is not, identical in the different sections. Hence all parallel conductors are short-circuited at the point of transfer from one section to another. The distribution of current in the conductors of one section is thus independent of the current distribution in the other sections. For example, an installation may use $3n$ bars in the first section, $2n$ flexible cables in the next section, and then use only $n$ bars from the flexible cables to the electrode on the furnace. Between each of the sections, the individual conductors are short-circuited making the current distribution in the conductors of one section independent of the current distribution in the conductors of the other sections.

To obtain an equal distribution of current in all conductors, the short-circuiting of parallel conductors is, pursuant to the invention, omitted at the point of transfer from one section to the next, and each single conductor or group of conductors in one section is connected to one conductor or group of conductors in the next section. The number of conductors or groups of conductors in any one section must therefore be a multiple of the conductors or groups of conductors in the other sections. For example there may be $n$ bars in the first section, $2n$ cables in the second section, two connected to each bar, and $n$ bars in the third section, one connected to each pair of cables. There is no short circuiting of the conductors at the points between the sections, the current distribution being kept equal by the arrangement according to the invention.

It will be possible to achieve the smallest obtainable difference of total impedance in the various series-connected sections of the conductors by connecting a single conductor or group of conductors of one section having great impedance, to a single conductor or group of conductors of another section having a small impedance, and thus reducing the size of the equalizing transformer.

Figure 3:
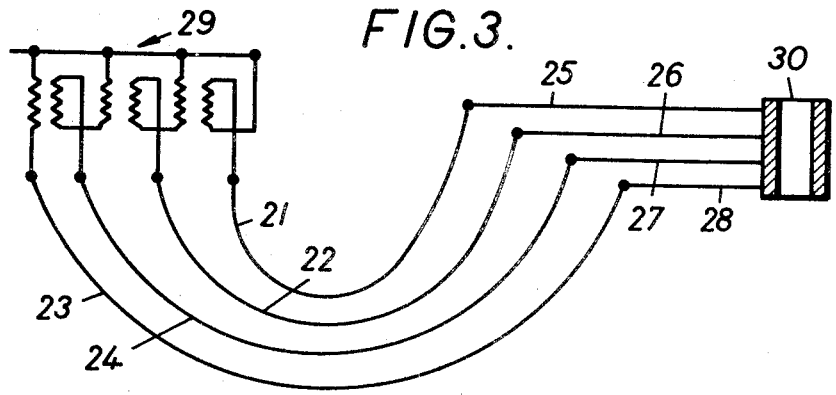
Fig. 3 shows a diagrammatic arrangement of four conductors in a device according to the invention.
Figure 4:
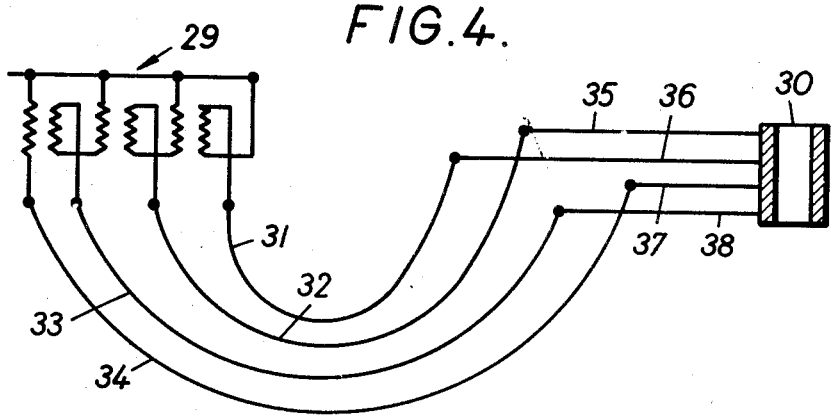
Fig. 4 shows a different arrangement of four conductors.

The above mentioned arrangement is shown in Figs. 3 and 4. Fig. 3 shows four conductors, each consisting of one cable (21—24) and one bar (25—28). 29 is the equalizing transformer and 30 the electrode clamping device.

Fig. 4 shows another embodiment, likewise comprising four conductors, each consisting of a cable (31—34), and a bar (35—38), the cables and bars being in this case connected in such a way that one cable, for example 33, having large impedance is connected to a bar 38 having small impedance, the other conductors being similarly arranged.

On larger furnaces, bars and cables of one phase are often arranged in two or more adjacent approximately vertical planes. If the currents are large, demanding large cross sections of the conductors, it may often be necessary to use this arrangement to conserve space. This arrangement may even be an advantage to equalize the impedances in the various conductors. The equalizing transformer core can in this case advantageously be furnished with adjacent rows of holes, corresponding to the number of conductors or groups of conductors. The magnetic coupling of the conductors in the two rows can be established by passing one or more conductors in one row through the holes in the other. The arrangement of the conductors is executed in such a way that the most favourable induction in the transformer core will be obtained.

Fig. 5 shows schematically a core for conductors arranged as described above in which the conductors are arranged in the core in one arrangement, while Fig. 6 shows a similar set of conductors arranged in the core in another arrangement.

Fig. 7 shows the positioning and numbering of cables in the arrangements shown in Figs. 5 and 6. In both embodiments 12 conductors, 41—52, are used, with currents $I_{41}$—$I_{52}$.

It is assumed that the impedances will be such that $I_{41} > I_{42} > I_{43}$
$I_{46} > I_{45} > I_{44} > I_{43}$
$I_{46} > I_{41}$
$I_{47} > I_{48} > I_{49}$
$I_{52} > I_{51} > I_{50} > I_{49}$ and
$I_{52} > I_{47}$ This will usually be the case if equalization only relates to the cables, and 46 and 52 constitute the uppermost cables. The difference between the currents is small and is equivalent to the magnetizing currents in the equalizing transformer.

As will be seen from the figures, the field distribution in Fig. 5, is the most favourable, the field in the central part of the core being zero. This part of the iron core can therefore, be omitted. Such omission may not in general be favourable, as fields will be created in this part of the core, caused by influence from the other phases. Moreover fields may also be created by asymmetries in the cable arrangement.

Electro-furnaces are usually supplied with three phase alternating current. It is known that in three-phase transformer, which is fed from a network with symmetrical three-phase voltage, the vectorial sum of the fields corresponding to the three phases is zero. This means that a three-phase transformer core can be made with three legs, each joined at the ends to a yoke, the field from one leg returning through the legs of the other two phases. This property of a polyphase system can be utilized in the present invention, by using a common transformer core for all the phases, the core having the same number of legs as there are phases of the current.

Figure 8:
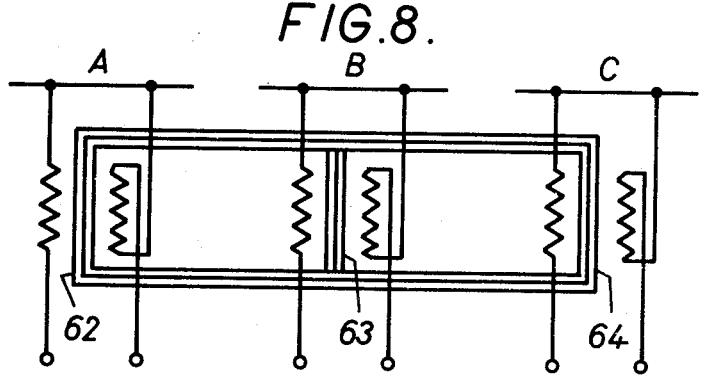

Fig. 8 shows an equalizing transformer with three legs 62, 63 and 64 for three phases A, B and C with two conductors per phase. Assuming symmetrically suspended cables and equal phase currents, the field in the leg of phase A will at each moment be equal to the sum of the fields in the legs of phases B and C.

Figure 9:
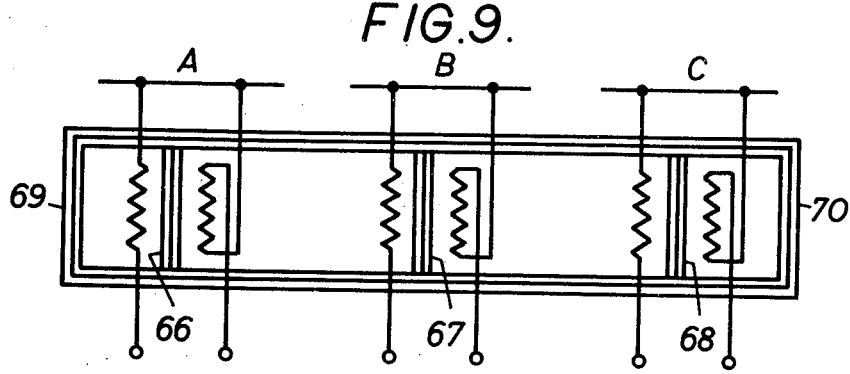
Fig. 9 shows another embodiment of such an equalizing transformer.

Thus, relative to three one-phase transformers, there is a saving in amount of iron corresponding to three legs. Frequently, however, the cables are not perfectly symmetrically suspended, and the load on the three phases are different. In such case the field in leg 62 will not be exactly equal to the sum of the fields in 63 and 64. To absorb this difference, one more leg can be added, possibly one on each side, as shown in Fig. 9. This figure denotes an equalizing transformer provided with three legs, 66—68, for the three phases A, B and C, and two extra legs, 69 and 70 to absorb the voltage difference resulting from asymmetrical loading. As these legs, 69 and 70, will only be dimensioned for relatively small voltage differences, material is still saved in the transformer.

I claim:

1. Means for conducting alternating current over a plurality of paths, comprising in combination a plurality of separate adjacent conductors, and an iron core having a plurality of apertures therein, one for each two adjacent conductors, each two adjacent conductors extending through one of the apertures in said iron core in a direction such that the instantaneous magnetic flux caused by the current in one conductor is in the opposite direction to the instantaneous magnetic flux caused by the current in the other conductor, whereby the two conductors are coupled magnetically and consequently all the conductors are coupled magnetically.

2. In an electric furnace having an electrode and a source of alternating electric current, improved means for conducting currents from the source to the electrode over a plurality of paths, said means comprising in combination a plurality of separate adjacent groups of conductors, and an iron core having a plurality of apertures therein, one for each two adjacent groups of conductors, each two adjacent groups of conductors extending through one of the apertures in said iron core in a direction such that the instantaneous magnetic flux caused by the current in one group of conductors is in the opposite direction to the instantaneous magnetic flux caused by the current in the other group of conductors, whereby the two groups of conductors are coupled magnetically and consequently all the groups of conductors are coupled magnetically.

3. Means as claimed in claim 1 in which said conductors are arranged in a plurality of parallel planes, and the said apertures are arranged in a plurality of rows, one row for each of the planes of conductors, each two adjacent conductors in each plane extending through one of the apertures in the corresponding row of apertures in a direction such that the instantaneous magnetic flux caused by the current in one conductor is in the opposite direction to the instantaneous magnetic flux caused by the current in the other conductor, and one conductor from each plane extending through one aperture in an adjacent row together with one conductor from the plane corresponding to said adjacent row in a direction such that the instantaneous magnetic fluxes caused by the currents in the said pair of conductors from the different planes are in opposite directions, whereby the two conductors are coupled magnetically and consequently the whole plurality of conductors are coupled magnetically.

4. Means as claimed in claim 2 in which the groups of conductors are arranged in a plurality of parallel planes, and the said apertures are arranged in a plurality of rows, one row for each of the planes of groups of conductors, each two adjacent groups of conductors in each plane extending through one of the apertures in the corresponding row of apertures in a direction such that the instantaneous magnetic flux caused by the current in one group of conductors is in the opposite direction to the instantaneous magnetic flux caused by the current in the other group of conductors, and one group of conductors from each plane extending through one aperture in an adjacent row of apertures together with one group of conductors from the plane corresponding to said adjacent row in a direction such that the instantaneous magnetic fluxes caused by the currents in the said pair of groups of conductors from the different planes are in opposite directions, whereby the groups of conductors are coupled magnetically and consequently the whole plurality of groups of conductors are coupled magnetically.

5. Means for conducting alternating current over a plurality of paths, comprising two sections of conductor portions each having a plurality of separate adjacent conductor portions with different voltage drops across the separate conductor portions, the individual conductor portions in one section being connected in series with the individual conductor portions in the other sections to form a complete conductor, with the conductor portion in the one section having the largest voltage drop thereacross being connected to the conductor portion in the other section with the smallest voltage drop thereacross, and the remaining individual conductor portions in the one section being connected in the order of decreasing voltage drops thereacross with the individual conductor portions in the other section in the order of increasing voltage drops thereacross, and an iron core having a plurality of apertures therein, one for each two adjacent conductors, each two adjacent conductors extending through one of the apertures in said iron core in a direction such that the instantaneous magnetic flux caused by the current in one conductor is in the opposite direction to the instantaneous magnetic flux caused by the current in the other conductor whereby the two conductors are coupled magnetically and consequently all the conductors are coupled magnetically.

6. Means for conducting alternating current over a plurality of paths, comprising two sections of groups of conductor portions each section having a plurality of groups of separate adjacent conductor portions with different voltage drops across the separate groups of conductor portions, the individual groups of conductor portions in one section being connected in series with the individual groups of conductor portions in the other section to form a group of complete conductors, with the group of conductor portions in the one section having the largest voltage drop thereacross being connected to the group of conductor portions in the other section with the smallest voltage drop thereacross, and the remaining individual groups of conductor portions in the one section being connected in the order of decreasing voltage drops thereacross with the individual groups of conductor portions in the other section in the order of increasing voltage drops thereacross, and an iron core having a plurality of apertures therein, one for each two adjacent conductors, each two adjacent conductors extending through one of the apertures in said iron core in a direction such that the instantaneous magnetic flux caused by the current in one conductor is in the opposite direction to the instantaneous magnetic flux caused by the current in the other conductor, whereby the two conductors are coupled magnetically and consequently all the conductors are coupled magnetically.

References Cited in the file of this patent
UNITED STATES PATENTS

| | | |
|---|---|---|
| 1,127,475 | Marshall | Feb. 9, 1915 |
| 1,551,275 | Wagner et al. | Aug. 25, 1925 |
| 1,729,713 | Dicke | Oct. 1, 1929 |
| 1,886,751 | Butow | July 12, 1932 |
| 2,229,680 | Somes | Jan. 28, 1941 |
| 2,368,998 | Nissim | Feb. 6, 1945 |
| 2,373,906 | Mouridian | Apr. 17, 1945 |